United States Patent [19]
Fukumoto et al.

[11] Patent Number: 5,315,445
[45] Date of Patent: May 24, 1994

[54] AUDIO SIGNAL RECORDING APPARATUS AND METHOD FOR USE WITH VTR

[75] Inventors: Kenji Fukumoto, Chiba; Ichiro Okamoto, Saitama; Keitaro Yamashita, Tokyo, all of Japan

[73] Assignee: Sony Corporation, Tokyo, Japan

[21] Appl. No.: 757,653

[22] Filed: Sep. 5, 1991

[30] Foreign Application Priority Data

Sep. 14, 1990 [JP] Japan ................. 2-245111

[51] Int. Cl.$^5$ ............................... G11B 5/02
[52] U.S. Cl. ..................... 360/19.1; 358/343; 360/27; 360/32
[58] Field of Search ............ 360/19.1, 27, 32; 358/343

[56] References Cited

U.S. PATENT DOCUMENTS

| | | | |
|---|---|---|---|
| 4,751,590 | 6/1988 | Wilkinson | 360/19.1 |
| 5,012,352 | 4/1991 | Yoshimura et al. | 360/19.1 X |
| 5,043,830 | 8/1991 | Nobuhiro | 360/19.1 |

FOREIGN PATENT DOCUMENTS

| | | |
|---|---|---|
| 3918454A1 | 12/1989 | Fed. Rep. of Germany . |
| 254673 | 10/1990 | Japan ................. 360/19.1 |
| 2220521 | 1/1990 | United Kingdom . |

OTHER PUBLICATIONS

Proceedings of the Annual Conference On Video, Audio and Data Recording 24 Apr. 1990,; IEEE, London, GB pp. 93–100, XP 218942 Sasaki, Ohtsu, Chiba, Bannai et al. '½ Inch Video Cassette Recorder For Baseband HDTV' p. 93, left column, line 16–line 31, p. 93, right column, line1–p. 94, right column, line 56 FIGS. 1, 2, 4; table 2.

*Primary Examiner*—Paul Gensler
*Attorney, Agent, or Firm*—William S. Frommer; Alvin Sinderbrand

[57] ABSTRACT

An audio signal recording apparatus and method for recording an video signal (e.g., a half field) and at least four channels of audio signals corresponding to the video signal to a plurality of tracks on a tape. The audio signals are recorded to recording blocks in an audio recording area which are separated from a recording area for the corresponding video signal in accordance with a priority rating. More specifically, the at least four channels of audio signals are divided into groups each having a plurality of channels. The audio signal recording area is divided into a plurality of recording blocks in the longitudinal direction of the tracks and each group of audio data is recorded to one of the audio signal recording blocks. Each group of audio data is assigned a priority rating depending on the importance of the data contained therein. Audio data having a high priority are recorded to blocks that are located further away from the track ends than those for audio data having a low priority. Since the contact fit between the tape and a recording head at the track ends is unstable, by recording the audio data of high priorities in blocks located relatively for away from the track ends where the tape-to-head contact fit is more stable, deterioration in sound quality is minimized for the important data upon reproduction.

7 Claims, 12 Drawing Sheets

| MODE | AUDIO MODE | | AUDIO USE POSITION | | | |
|---|---|---|---|---|---|---|
| | TV (PRIMARY AUDIO SIGNAL) | SECONDARY AUDIO SIGNAL | CH 1 | CH 2 | CH 3 | CH 4 |
| A | 1 CHANNEL STEREO | 1 CHANNEL STEREO | AUDIO 1 | AUDIO 2 | AUDIO 3 | AUDIO 4 |
| A | 1 CHANNEL STEREO | 2 CHANNEL MONAURAL | AUDIO 1 | AUDIO 2 | AUDIO 3 | AUDIO 4 |
| A | 2 CHANNEL MONAURAL | 1 CHANNEL STEREO | AUDIO 1 | AUDIO 2 | AUDIO 3 | AUDIO 4 |
| A | 2 CHANNEL MONAURAL | 2 CHANNEL MONAURAL | AUDIO 1 | AUDIO 2 | AUDIO 3 | AUDIO 4 |
| A | 2 CHANNEL STEREO | — | AUDIO 1 | AUDIO 2 | AUDIO 3 | AUDIO 4 |
| A | 1 CHANNEL STEREO + 2 CHANNEL MONAURAL | — | AUDIO 1 | AUDIO 2 | AUDIO 3 | AUDIO 4 |
| A | 4 CHANNEL MONAURAL | — | AUDIO 1 | AUDIO 2 | AUDIO 3 | AUDIO 4 |
| A | 4 CHANNEL (3-1 SYSTEM) STEREO | — | AUDIO 1 | AUDIO 2 | AUDIO 3 | AUDIO 4 |
| A | 3 CHANNEL STEREO + 1 CHANNEL MONAURAL | — | AUDIO 1 | AUDIO 2 | AUDIO 3 | AUDIO 4 |
| A | 4 CHANNEL (2-2 SYSTEM) STEREO | — | AUDIO 1 | AUDIO 2 | AUDIO 3 | AUDIO 4 |
| A | 1 CHANNEL STEREO | 1 CHANNEL MONAURAL | AUDIO 1 | AUDIO 2 | AUDIO 3 | — |
| A | 2 CHANNEL MONAURAL | 1 CHANNEL MONAURAL | AUDIO 1 | AUDIO 2 | AUDIO 3 | — |
| A | 1 CHANNEL STEREO + 1 CHANNEL MONAURAL | — | AUDIO 1 | AUDIO 2 | AUDIO 3 | — |
| A | 3 CHANNEL MONAURAL | — | AUDIO 1 | AUDIO 2 | AUDIO 3 | — |
| A | 3 CHANNEL STEREO | — | AUDIO 1 | AUDIO 2 | AUDIO 3 | — |

FIG. 3B

| | | | | | |
|---|---|---|---|---|---|
| A | 1 CHANNEL STEREO | — | AUDIO 1 | AUDIO 2 | — | — |
| A | 2 CHANNEL MONAURAL | — | AUDIO 1 | AUDIO 2 | — | — |
| A | 1 CHANNEL MONAURAL | 1 CHANNEL STEREO | AUDIO 1 | — | AUDIO 3 | AUDIO 4 |
| A | 1 CHANNEL MONAURAL | 2 CHANNEL MONAURAL | AUDIO 1 | — | AUDIO 3 | AUDIO 4 |
| A | 1 CHANNEL MONAURAL | 1 CHANNEL MONAURAL | AUDIO 1 | — | AUDIO 3 | — |
| A | 1 CHANNEL MONAURAL | — | AUDIO 1 | — | — | — |
| A | — | 1 CHANNEL STEREO | — | — | AUDIO 3 | AUDIO 4 |
| A | — | 2 CHANNEL MONAURAL | — | — | AUDIO 3 | AUDIO 4 |
| A | — | 1 CHANNEL MONAURAL | — | — | AUDIO 3 | — |
| A | — | 1 CHANNEL MONAURAL | AUDIO 1 | — | — | — |
| B | 1 CHANNEL STEREO | | AUDIO 1 | | AUDIO 2 | |
| B | 2 CHANNEL MONAURAL | | AUDIO 1 | | AUDIO 2 | |
| B | 1 CHANNEL MONAURAL | | AUDIO 1 | | — | |
| B | 1 CHANNEL MONAURAL | | — | | — | |

| FIG. 3A |
|---|
| FIG. 3B |

AUDIO SIGNAL RECORDING APPARATUS AND METHOD FOR USE WITH VTR

BACKGROUND OF THE INVENTION

1. Field of the Invention

The present invention relates to an audio signal recording apparatus and method for use with video tape recorders (VTR's) such as those which record high definition television (HDTV) signals.

2. Description of the Prior Art

Some VTR's are designed to record and reproduce HDTV signals which have a wideband and a high frequency. Typically these VTR's record an HDTV signal per unit time (e.g., over one field) by dividing the signal into a plurality of segments on a plurality of channels. As a result, the frequency of the recorded signal is lowered and the frequency band is reduced.

Figure 7:
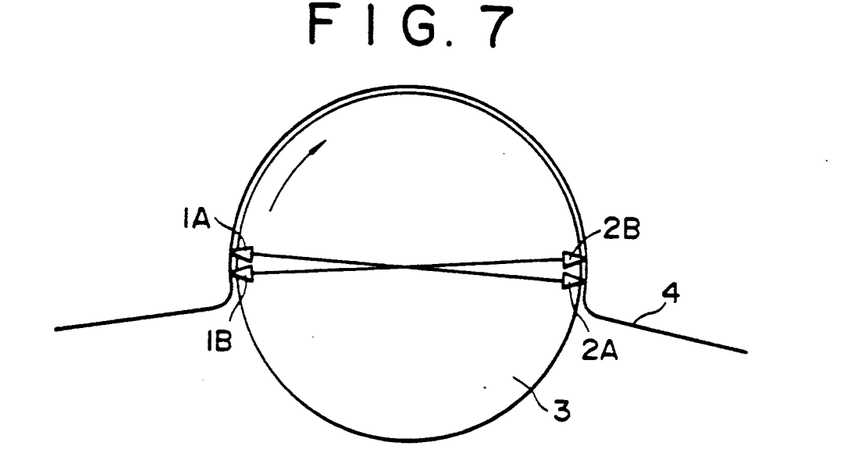
FIG. 7 is a view of a rotating head for use with the apparatus of FIG. 4.

FIG. 7 is a typical rotating head device for use with the above-mentioned VTR's. In FIG. 7, an A channel head 1A having a first azimuth position and a B channel head 1B having a second azimuth position, which is different from the first azimuth position, are located so as to have the same angular position with respect to a rotating drum 3, that is, the heads 1A and 1B are one track width apart along the axis of rotation. Likewise, another A channel head 2A having the first azimuth position and another B channel head 2B having the second azimuth position are located 180 degrees away from heads 1A and 1B, in which the heads 2A and 2B are also one track width apart along the axis of rotation of the drum 3. A magnetic tape 4 is wound obliquely around a 180 degree-plus angular portion of the drum 3. The rotating heads 1A, 1B, 2A and 2B are rotated at a rotating speed of 60 Hz.

Figure 8:
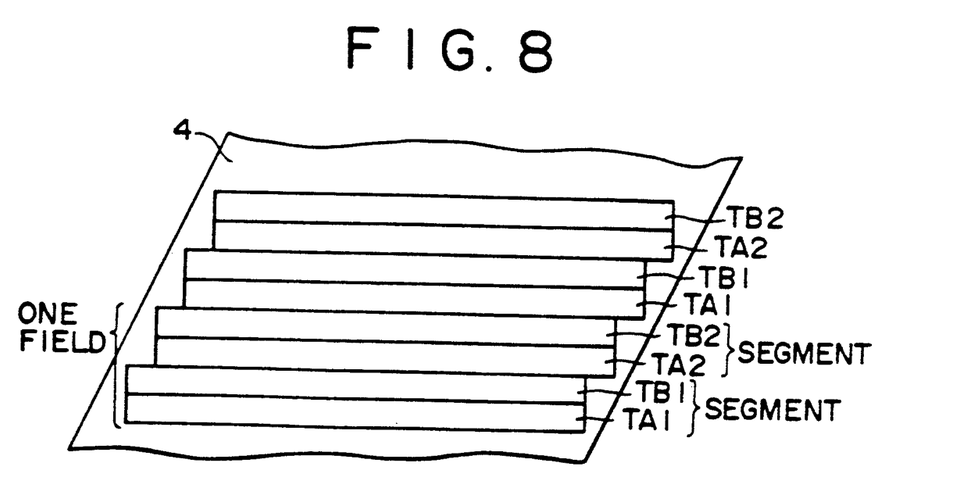
FIG. 8 is a recording track pattern formed by the rotating head of FIG. 7.

In the above-described rotating head device, each pair of rotating heads, that is, 1A, 1B and 2A, 2B, alternately records the HDTV signals to the oblique recording tracks on the magnetic tape 4 shown in FIG. 8. Thus each pair of heads records the signals over a tape contact segment corresponding to that obtained by rotating the drum 3 through a 180 degree angle.

More specifically, during the first half of one rotation of the rotating drum 3, that is, a 180 degree rotation, the rotating heads 1A and 1B contact the tape 4. During this half rotation, the rotating heads 1A and 1B simultaneously form an A channel track TA1 and a B channel track TB1 respectively. During the second half of the rotation or the second 180-degree rotation of the drum 3, the rotating heads 2A and 2B simultaneously form an A channel track TA2 and a B channel track TB2, respectively. These operations are alternated by the two pairs of rotating heads. In the above process, two tracks formed simultaneously by each pair of rotating heads, 1A and 1B or 2A and 2B, constitute one segment. Recorded in each segment is a video signal and a corresponding pulse code modulated (PCM) audio signal for a half-field. Therefore, four tracks, for example, TA1, TB1, TA2 and TB2, are used to record one field of signal data, and four segments are employed to record one frame of signal data.

When recording the HDTV signals with the VTR, the video signal, which includes a luminance signal and two color difference signals, is recorded in an analog format, whereas the audio signal, which is a PCM signal, is recorded in a digital format over four channels each representing 16 bits of audio data. These recorded video and audio signals are accommodated in different recording areas, which are arranged longitudinally, of the magnetic tape 4.

Figure 9A:
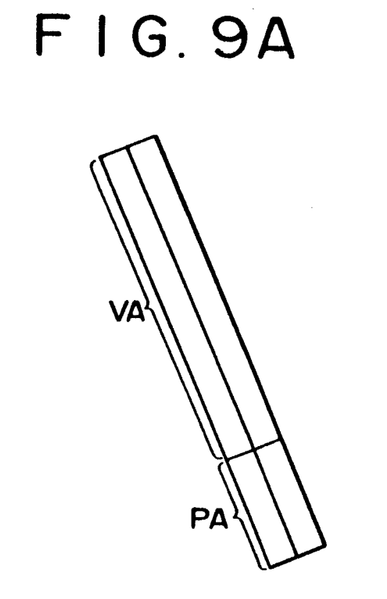
FIGS. 9A, 9B and 9C are arrangements of video and audio signal recording areas on a tape.
Figure 9B:
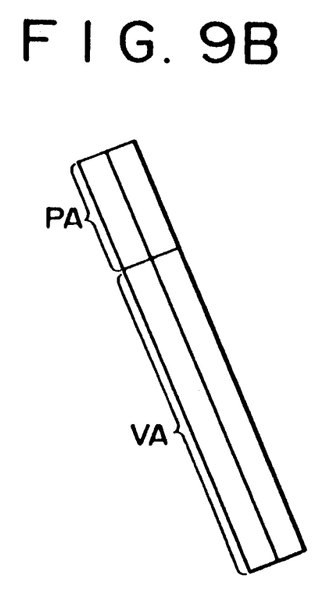
Figure 9C:
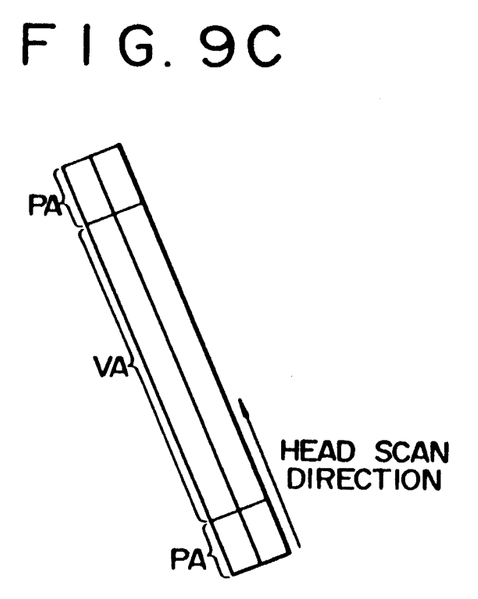

Experience has shown that providing a plurality of video signal recording areas per track complicates video signal processing. If the video recording area per track is therefore not divided, then there are three ways of establishing video and audio signal recording areas per track, as shown in FIGS. 9 (A), 9 (B) and 9 (C). In these figures, VA identifies a video signal recording area and PA identifies a PCM audio signal recording area.

In the arrangement of FIG. 9 (A), a PCM audio signal recording area PA is located on the starting side of each of the tracks TA1, TB1, TA2 and TB2 scanned by the rotating heads 1A, 1B, 2A and 2B, respectively. In the arrangement of FIG. 9 (B), a PCM audio signal recording area is located on the ending side of each track scanned by each head. In the arrangement of FIG. 9 (C), one PCM audio signal recording area is located on the starting side and one area is located on the ending side of each track scanned by each head.

Therefore, in each of the above-described arrangements, a PCM audio signal recording area PA is located on the starting and/or ending side of each head-scanned track. However, the head scan starting or ending part of any track is vulnerable to scratches or damage which may be inflicted because of its location at a tape end. This damage tends to produce drop-outs in the reproduced signal. Furthermore, since the head scan starting part of the tape is the part where a head starts contacting the tape, a relatively snug fit between the head and the tape has not as yet been achieved. This can cause the RF reproduction output to fluctuate and can lead to signal dropouts. This problem is more likely to occur the closer the position of contact is to a longitudinal end of the tape.

When the audio signal is conventionally recorded in the PCM signal format, the so-called interleaving process is utilized and error correction codes are added to the audio signal. The interleaving process generally involves distributing PCM audio data samples within the recording areas according to a predetermined set of rules. To record the audio signal, the audio signal of each channel is distributed to the two tracks of each segment. In interleaving processing, if a data sample from the signal of one of the two tracks has dropped-out and cannot be corrected by an error correction code, then for reproduction, another data sample which is intact and located relatively near the dropped sample is interpolated so as to approximately reconstruct the missing audio signal.

However, signal reconstruction utilizing interpolation techniques, as discussed above, inevitably causes some degree of degradation in the sound quality. The greater the magnitude of signal drop-outs, the more pronounced the sound quality degradation.

If the audio signals of all four channels are recorded in the above-described conventional manner and under the same conditions, then all of the reproduced signals will contain the above-described draw-backs.

OBJECTS AND SUMMARY OF THE INVENTION

Accordingly, it is an object of the present invention to provide a technique for recording an audio signal which avoids the above-mentioned disadvantages of the prior art.

More specifically, it is an object of the present invention to provide an audio signal recording apparatus and method for minimizing the degradation of audio signals on primary channels when the audio signals associated with at least four channels are each recorded in recording areas which are separate from those for video signals.

That is, multichannel audio signals, which are carried by at least four channels, may not necessarily each have the same degree of importance associated therewith. For example, consider a four audio channel device that provides stereo sound and dual language capability. In this device the primary language or the primary stereo sound signals are typically carried over the first and the second channels which, for example, may be the two front channels, while the secondary language or the secondary stereo sound signals are carried over the third and the fourth channels which, for example, may be the two rear channels. Thus, as a result in this example, not all of the channels have the same importance.

The technique according to the present invention takes the above point into account, in that, the present invention preferentially records the relatively more important audio signals, carried on the primary channels, onto those recording areas of the tape in which the occurrence of drop-outs is minimal.

According to one aspect of the present invention, a method is provided for recording audio signals onto a tape by a recording apparatus which also records video signals onto the tape, in which the apparatus has a plurality of rotating heads which simultaneously scan the tape, the method comprising the steps of: forming an oblique recording track on the tape for each of the rotating heads which simultaneously scan the tape without any guard bands being inserted between the oblique recording tracks, the formed oblique recording tracks constituting one segment; recording the video signals in a longitudinal direction in a video signal recording area in each of the oblique recording tracks for each segment; arranging at least four channels of audio signals into a plurality of groups, in which each of the groups includes the audio signals from a plurality of the channels and is assigned a predetermined priority rating; and recording in a longitudinal direction, for each segment, the audio signals in each of the groups which correspond to the video signals recorded for the respective segment in a number of audio signal recording areas in each of the oblique recording tracks, the number of the recording areas being equal to the number of the groups, in which each of the audio signal recording areas is separated from the corresponding video signal recording areas and is located at a respective distance in the longitudinal direction from an end of the respective oblique recording tracks, and in which the audio signals from each of the groups are recorded in the audio signal recording areas in accordance with the respective predetermined priority rating such that the audio signals from the group having the highest priority rating are recorded in the audio signal recording area located at the farthest distance from the end of the respective oblique recording track.

As the priority for a channel group increases, the audio signal corresponding to that channel group is recorded further away from either tape end in the longitudinal direction of each track. The farther away from the tape end, the more stabilized the contact fit between the tape and the rotating head becomes. Thus, the audio signal carried by a channel having relatively high priority is picked up by the corresponding head in a more stable manner so as to result in less degradation in sound quality during reproduction.

The above, and other objects, features and advantages of the present invention, will be more fully understood from the following detailed description of the preferred embodiment of the present invention when read in conjunction with the accompanying drawings in which corresponding parts are identified by the same reference numerals.

BRIEF DESCRIPTION OF THE DRAWINGS

FIG. 3, which comprises

FIG. 4, which comprises FIGS. 4A, 4B and 4C, is a block diagram of a recording apparatus to which the present invention may be applied;

FIG. 6, which comprises FIGS. 6A, 6B and 6C, is a block diagram of a reproducing apparatus to which the present invention may be applied;

DESCRIPTION OF THE PREFERRED EMBODIMENT

The preferred embodiment of the present invention will now be described with reference to the accompanying drawings. In this embodiment the present invention is applied to a high-definition television VTR that turns four-channels of audio signals into PCM audio signals and records them onto a magnetic tape along with the corresponding video signals.

Figure 3:
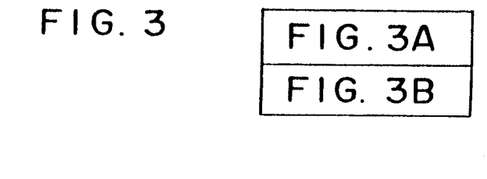
Figure 3A:
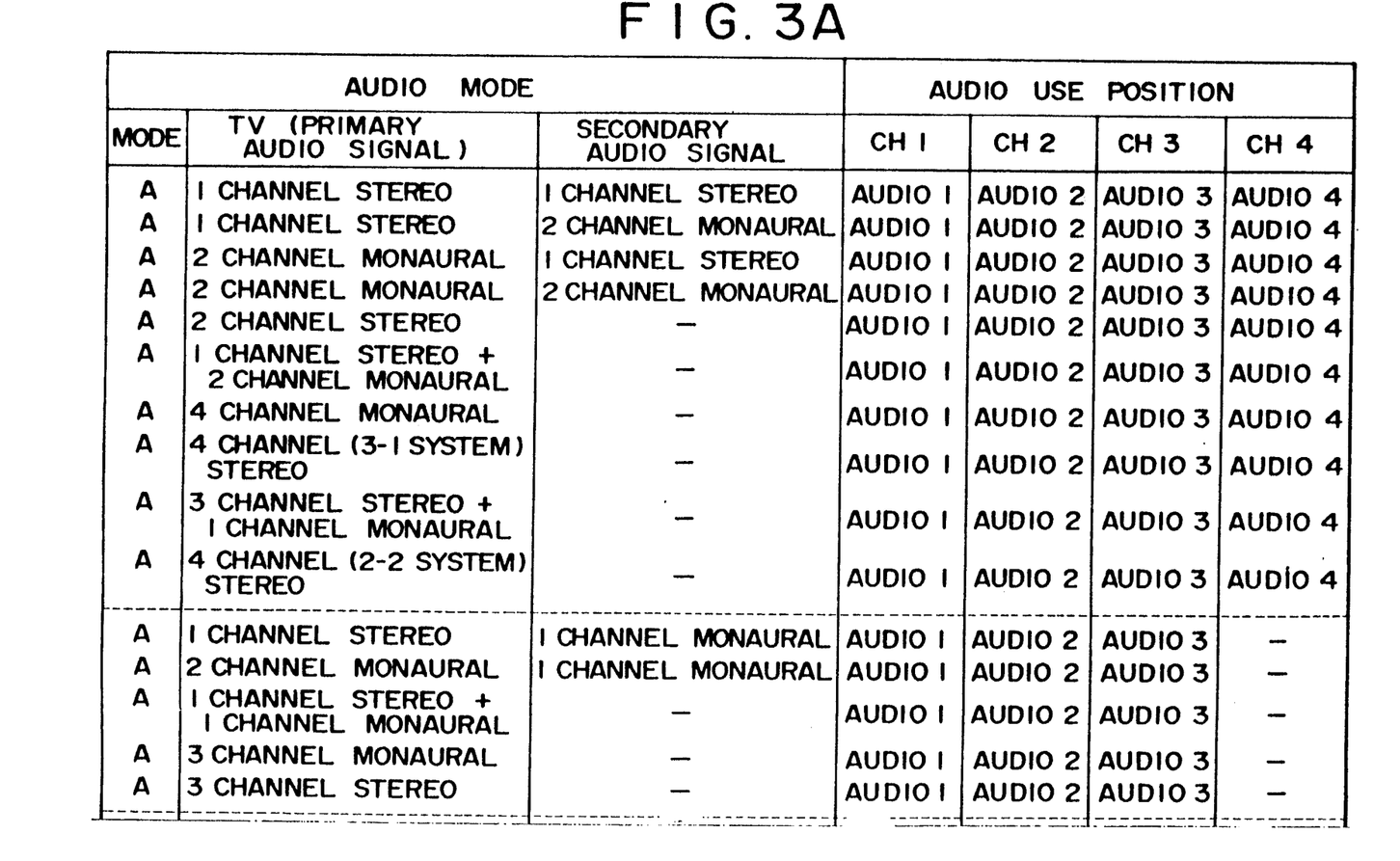
FIGS. 3A and 3B, illustrates in tabular form how HDTV signal audio modes are arranged under the so-called MUSE method.
Figure 3B:
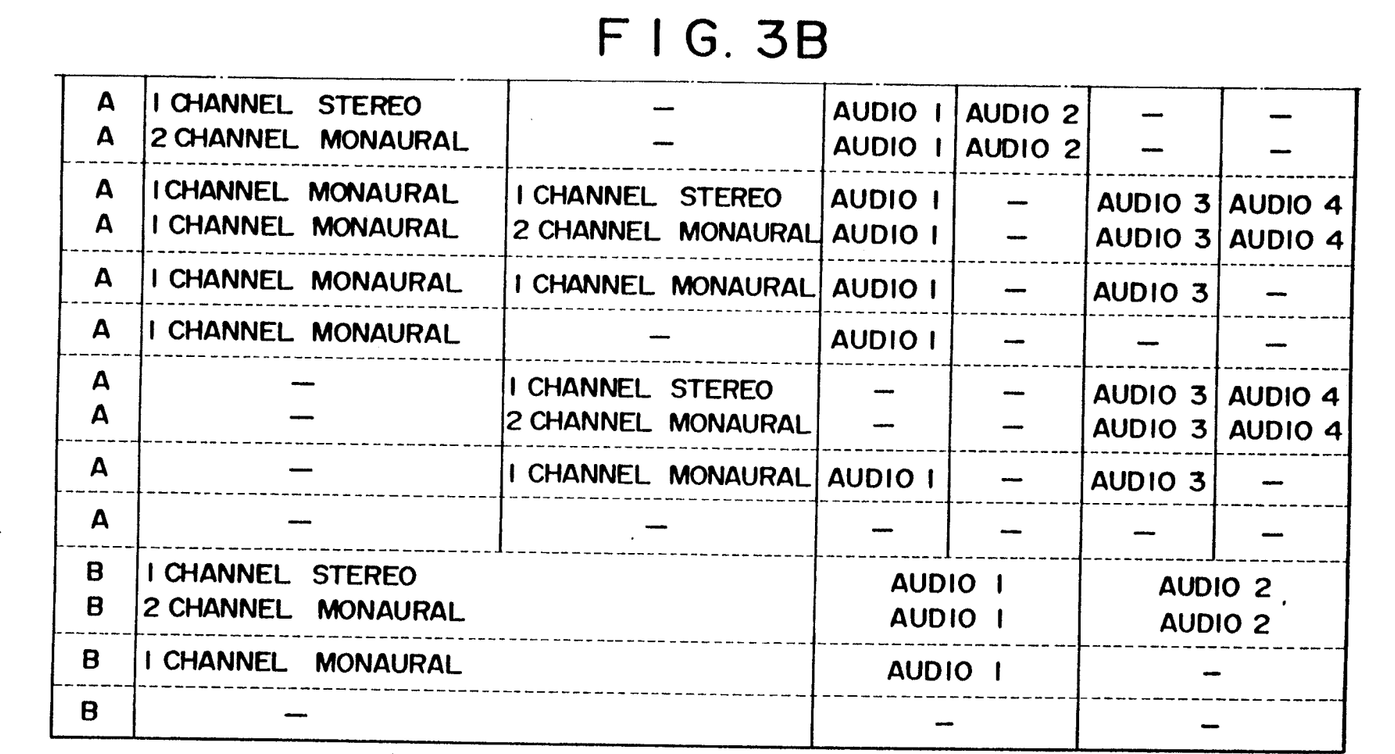

FIG. 3 shows how audio modes are typically arranged under the MUSE (multiple sub-nyquist sampling encoding) method, which is a method of HDTV broadcasting. The audio data broadcast under the MUSE method is a main source of audio data for HDTV VTR's.

In most of the audio modes for mode A stereo HDTV broadcasting under the MUSE method shown in FIG. 3, the primary audio data are assigned to a first channel CH1 and a second channel CH2. In a four-channel stereo arrangement, the primary audio data are also assigned to the first and the second channels CH1 and CH2 (i.e., the front right and left channels).

Thus, in the previously described situations the primary audio data are carried by the first and the second channels CH1 and CH2, respectively. In these situations, the primary audio data carried on the first and second channels CH1 and CH2 are recorded, in the longitudinal direction, on recording areas which are respectively away from both ends of each trace. The error rates associated with signals recorded in these areas are relatively low.

Figure 1:
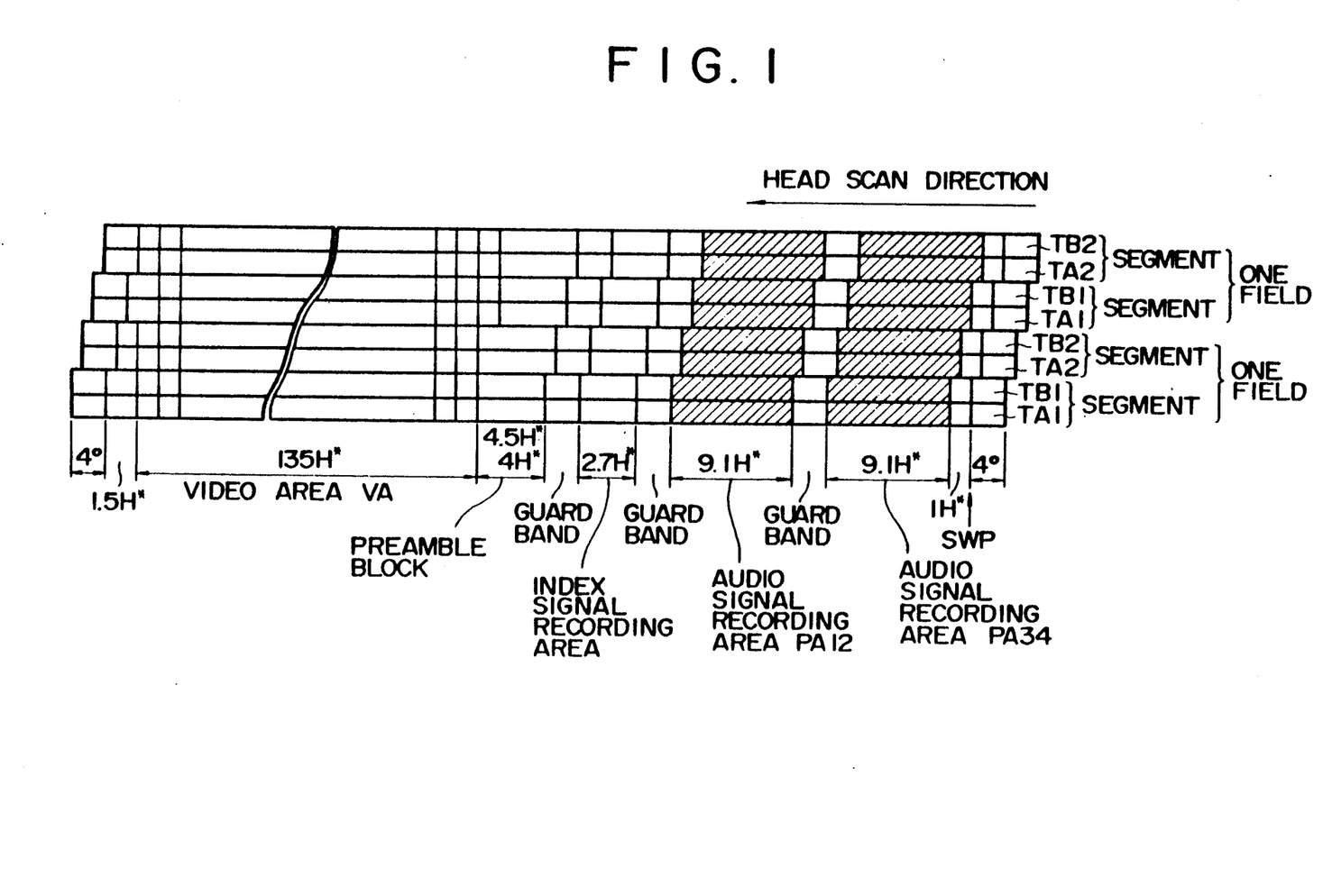
FIG. 1 is a recording track pattern utilized in connection with a recording apparatus and method of the present invention.

FIG. 1 illustrates a typical recording track pattern on a tape which may be produced by the rotating head device of FIG. 7 in the apparatus to which the present invention is applied.

As with the arrangement of FIG. 9 (A) in forming the track pattern of FIG. 1, the rotating head device forms PCM audio signal recording areas on the track scan starting side of the tape. As shown in FIG. 1, two separate audio signal recording areas, which are shaded with slashes, are provided. One PCM audio signal recording area, for example, area PA12, is associated with the first and second channels CH1 and CH2, and the other PCM audio recording area, for example area PA34, is associated with the third and fourth CH3 and CH4. The PCM audio signal recording area PA12 for the first and second channels is assigned a tape region which is farther away from the head scan starting end of tracks than the PCM audio signal recording area PA34 for the third and fourth channels. This allows the contact fit between the head and the tape to be more stable in the recording area PA12 than in the area PA34.

The track pattern of FIG. 1 will now be described in more detail.

The areas or blocks located at both ends of the tracks TA1, TB1, TA2 and TB2, which correspond to a rotation AL angle of four degrees, are each utilized for overlapping the track scan by the rotating heads 1A, 1B, 2A and 2B. Following the overlapping block is a head switching point SWP for switching between the pair of rotating heads 1A, 1B and the pair of rotating heads 2A, 2B. A 1H* block (H* represents a horizontal period of the recording signal) is provided as a margin block for the head switch over. Following the margin block is a 9.1H* block for the PCM audio signal recording area PA34 for the third and fourth channels. After the recording area PA34 is a guard band of 1.7H*. The guard band is in turn followed by the PCM audio signal recording area PA12 for the first and second channels. After the recording area PA12 is another guard band of 1.7H* followed by an index signal recording area of 2.7H*. After the index signal recording area is yet another guard band of 1.7H* followed by a video signal preamble block of 4H* (or 4.5H*). Following the preamble block is a video signal recording area VA of 135H*. The preamble block includes a CW signal (continuous wave signal for PLL synchronization), a segment synchronization signal, a reference level signal and a ramp signal.

Figures 4, 4C:
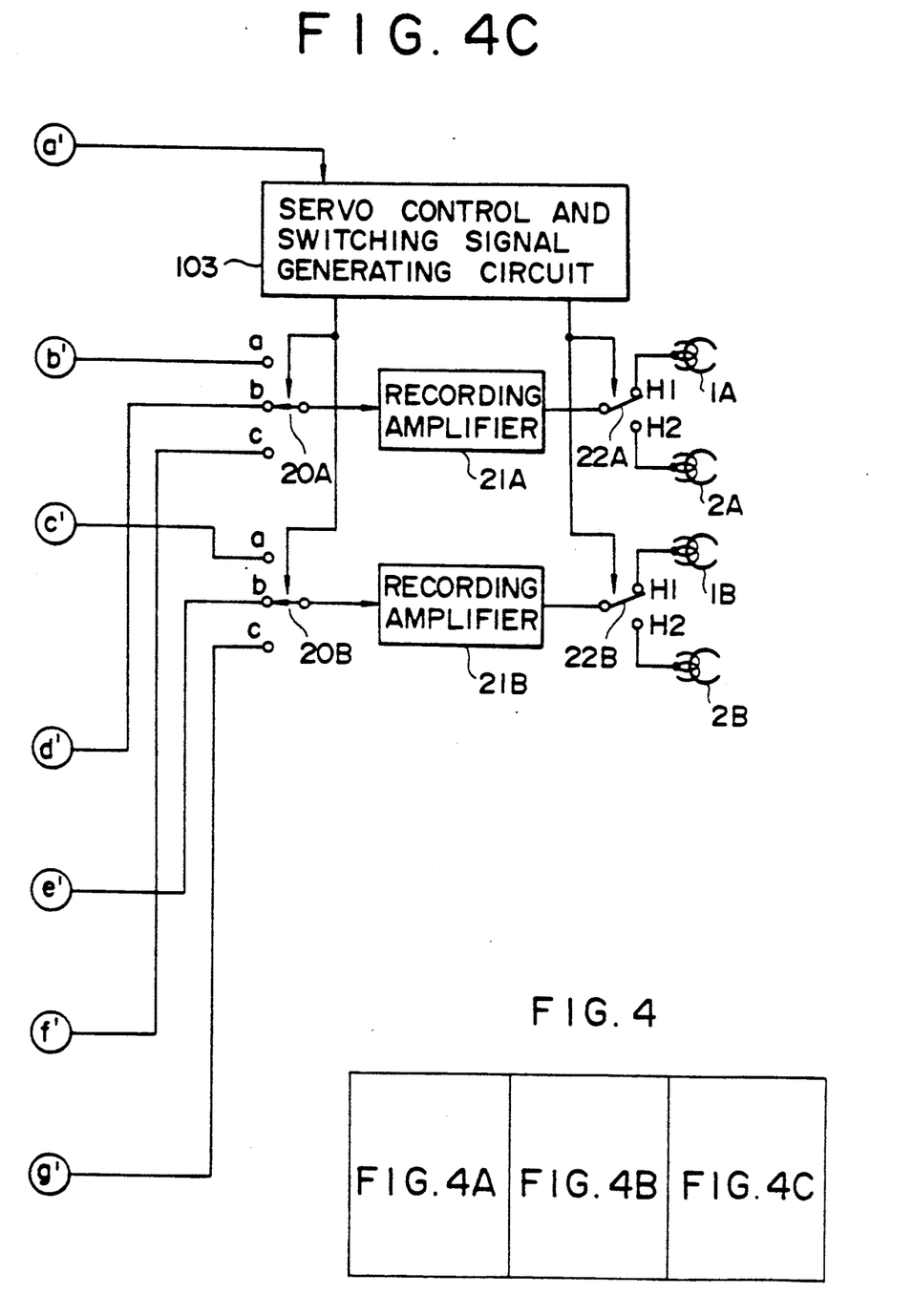
Figure 4A:
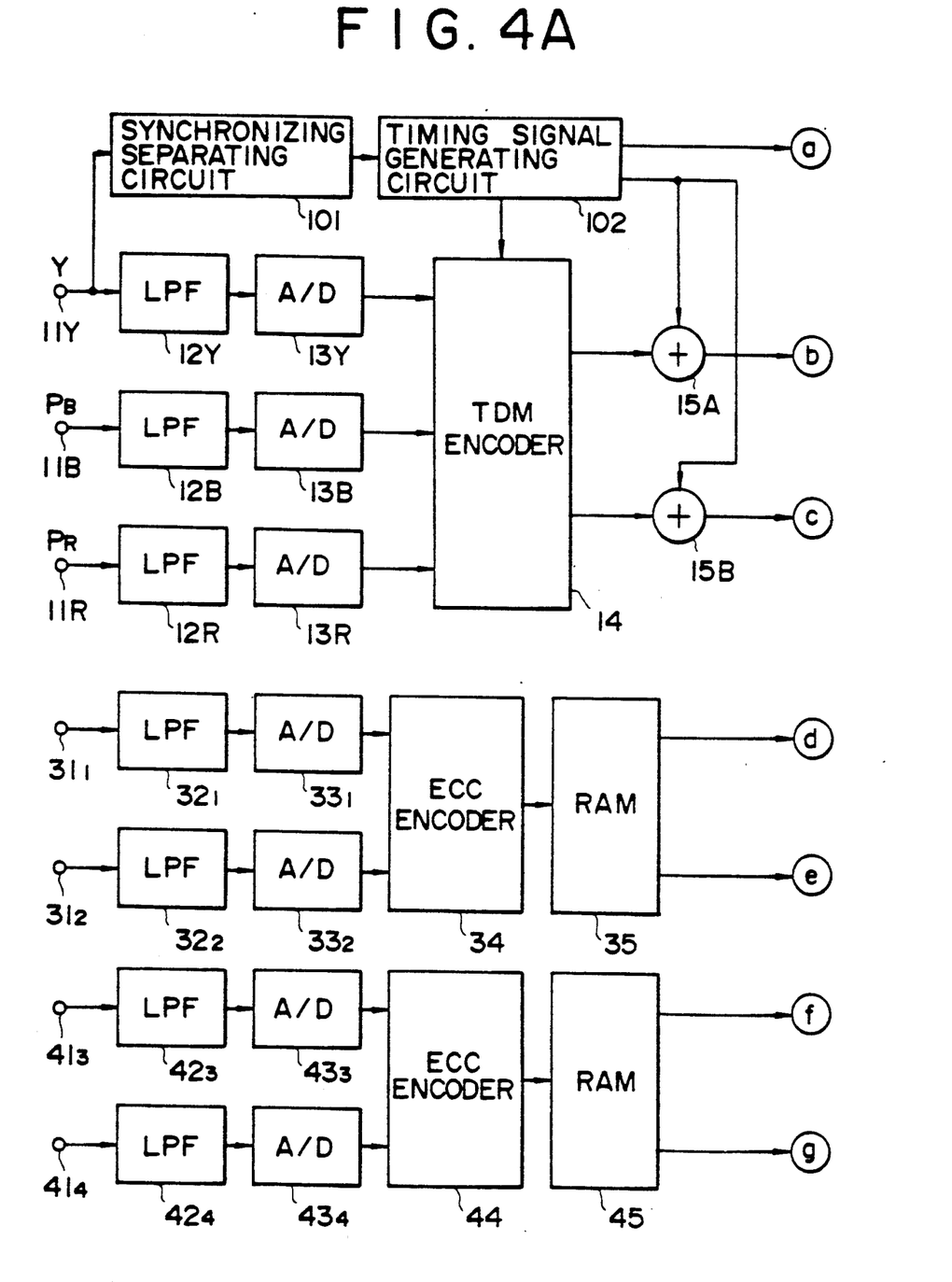
Figure 4B:
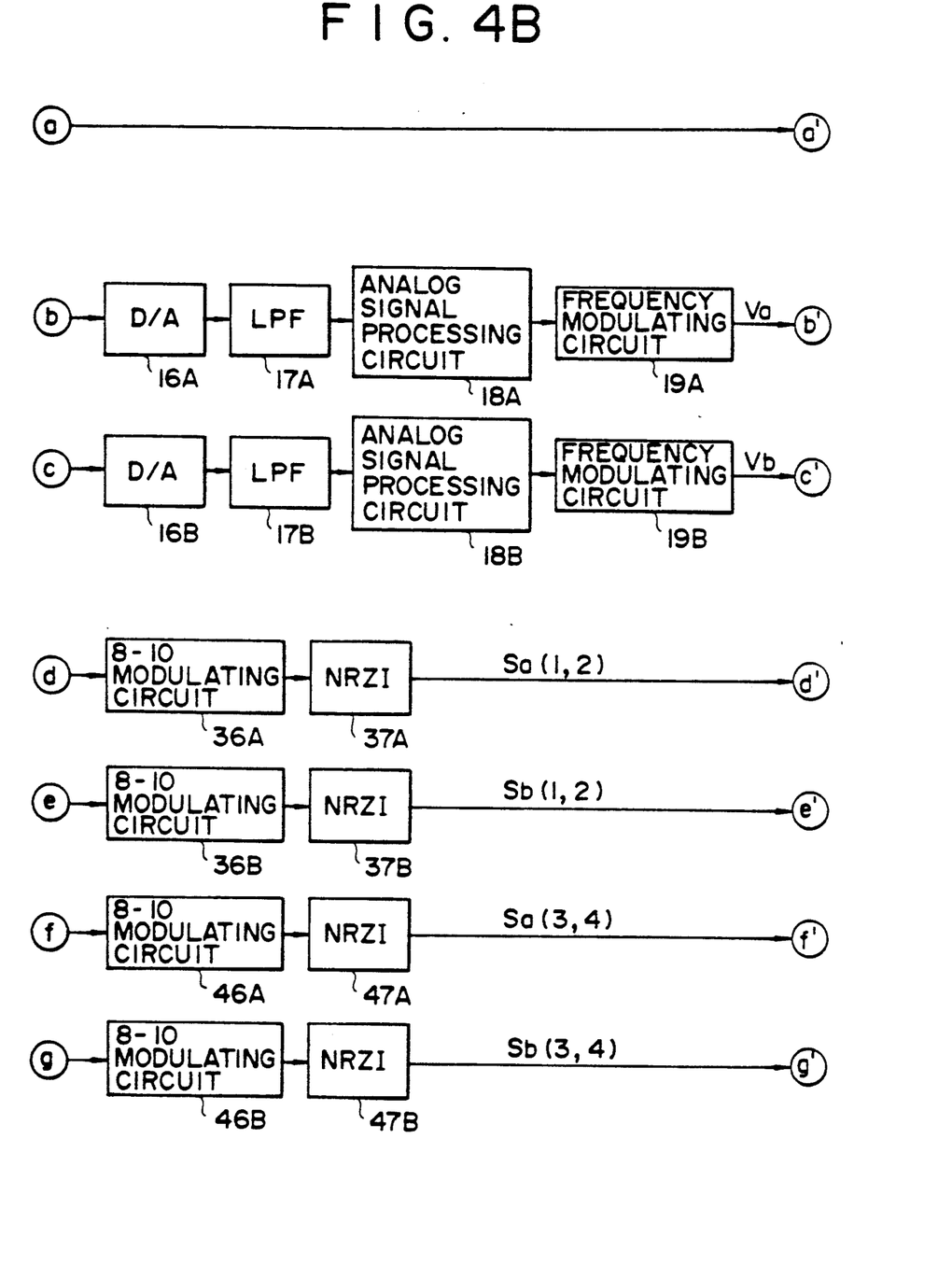

FIG. 4 is a block diagram of a typical HDTV signal recording apparatus to which the present invention may be applied.

As shown in FIG. 4, a luminance signal Y from an input terminal 11Y is supplied to an A/D converter 13Y by way of a lowpass filter 12Y. The luminance signal Y is converted by the A/D converter 13Y from analog to digital format at a sampling frequency of 4.55 MHz and is thereafter supplied to a TDM (time division multiplex) encoder 14. A blue color difference signal $P_B$ from input terminal 11B and a red color difference signal $P_R$ from input terminal 11R are respectively supplied to A/D converters 13B and 13R by way of low-pass filters 12B and 12R. These two color difference signals are respectively converted by the A/D converters 13B and 13R from analog to digital format at a sampling frequency of 11.1375 MHz before being supplied to the TDM encoder 14. The TDM encoder 14 is adapted to perform digital signal processing, such as time base handling and linear sequencing of color signals to as to arrange the incoming signals onto two channels A and B. Adders 15A and 15B combine the signal on each channel from the TDM encoder 14 with a synchronizing signal SYNC (different from that contained in the video signal) and a burst signal SB. The synchronizing signal SYNC and burst signal SB are generated by a timing signal generating circuit 102 which includes a PLL (phase locked loop) arrangement. A synchronizing separating circuit 101 receives the luminance signal Y from the input terminal 11Y and supplies the timing signal generating circuit 102 with a synchronizing signal that was separated from the input luminance signal Y. The PLL output clock of the timing signal generating circuit 102 maintains a constant phase relation with this synchronizing signal. Furthermore, the timing signal generating circuit 102 supplied the TDM encoder 14 with clock pulses and sends a timing signal to a servo control and switching signal generating circuit 103, which will be described later.

Figure 5:
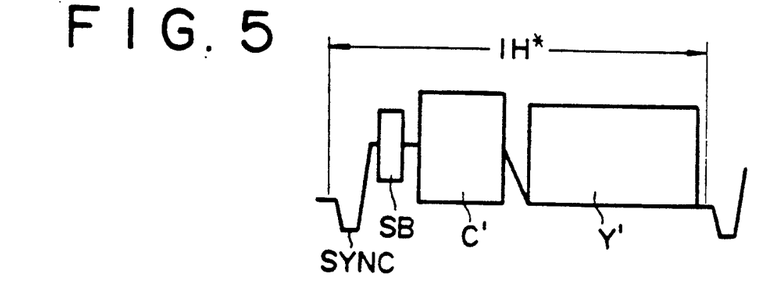
FIG. 5 is a waveform view to which reference will be made in explaining how the apparatus of FIG. 4 works.

The outputs of the adders 15A and 15B are respectively supplied to D/A converters 16A and 16B so as to be converted from digital to analog format. Each of the D/A converters 16A and 16B generates a TDM waveform signal which contains the synchronizing signal SYNC, the burst signal SB, a color signal C' and a luminance signal Y', as shown in FIG. 5. As mentioned above, the symbol H* represents one horizontal period of the recording signal, i.e., the TDM signal.

Figure 2A:
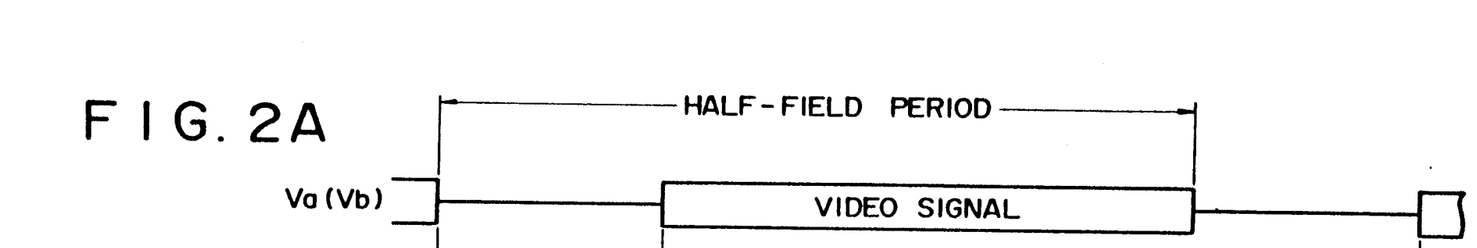
FIGS. 2A, 2B and 2C are timing charts to which reference will be made in describing the present apparatus and method.

The TDM waveform signals generated by the D/A converters 16A and 16B are respectively supplied through low-pass filters 17A and 17B to analog signal processing circuits 18A and 18B for pre-emphasis and other processing. Thereafter, the signal are respectively supplied to FM circuits 19A and 19B for frequency modulation. The FM circuit 19A supplies an FM video signal Va (see FIG. 2 (A)) on the A channel to a first input terminal "a" of a switching circuit 20A. The FM circuit 19B supplies an FM video signal Vb (see FIG. 2 (A)) on the B channel to the first input terminal "a" of a switching circuit 20B.

Meanwhile, audio signals on four channels are arranged into a first and a second group, in which the first and the second channels, are in the first group, and the third and fourth channels are in the second group. The first and the second channels of audio signals are respectively supplied from input terminals $31_1$ and $31_2$ through low-pass filters $32_1$ and $32_2$ to A/D converters $33_1$ and $33_2$ whereupon each audio signal is converted to digital audio data, in which each sample has 16 bits. The digital audio data from the converters $33_1$ and $33_2$ are supplied to an ECC encoder 34 which subjects the first and the second channels of audio signals as a whole to interleaving and error correction encoding. For this processing, the 16 bits per sample are divided into high-order eight-bits and low-order eight bits. The data in the first and second channels of audio signals are handled in units of eight-bit samples.

Figure 2B:
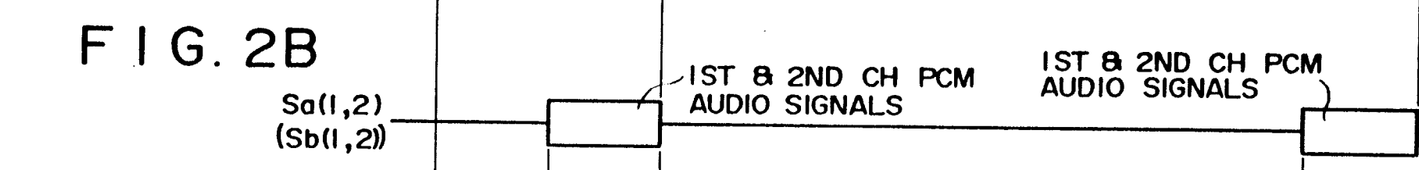

The output of the ECC encoder 34 is supplied to a RAM 35 and is therein divided into A channel data and B channel data. The A and the B channel data are respectively supplied to 8-10 modulating circuits 36A and 36B for eight-to-ten bit conversion. After this conversion, the data are respectively supplied to NRZI modulating circuits 37A and 37B which generate respective NRZI signals. The A channel signal Sa(1,2) (see FIG. 2 (B) of the first and the second channel PCM audio data from the modulating circuit 37A is supplied to an input terminal "b" of the switching circuit 20A; and the B channel signal Sb(1, 2) (see FIG. 2 (B)) of the first and the second channel PCM audio data from the modulating circuit 37B is supplied to the input terminal "b" of the switching circuit 20B.

The third and fourth channels of audio signals of the second group are respectively supplied from input terminals $41_3$ and $41_4$ through low-pass filters $42_3$ and $42_4$ to A/D converters $43_3$ and $43_4$, whereupon each audio signal is converted to digital audio data, in which each sample has 16 bits. The digital audio data from the A/D converters $43_3$ and $43_4$ are supplied to an ECC encoder 44 which subjects the third and fourth channels of audio signals as a whole to interleaving and error correction encoding, as in the previously described case of the first and the second channels of audio signals.

Figure 2C:
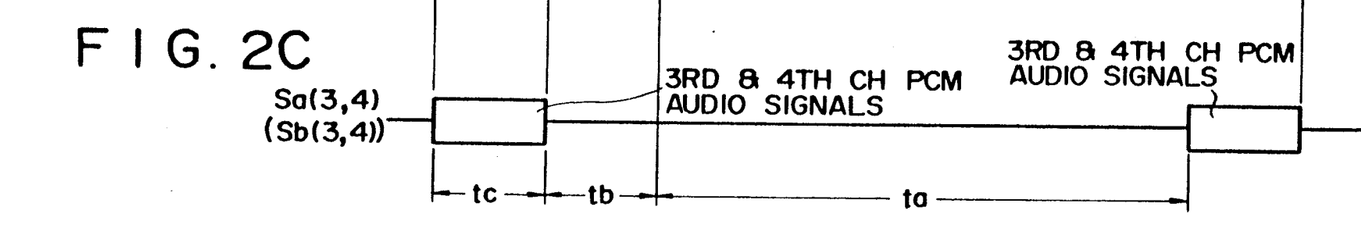

The output of the ECC encoder 44 is supplied to a RAM 45 and is therein divided into A channel data and B channel data. The A and the B channel data are respectively supplied to 8–10 modulating circuits 46A and 46B for eight-to-ten bit conversion. After this conversion, the data are respectively supplied to NRZI modulating circuits 47A and 47B which generate respective NRZI signals. The A channel signal Sa(3, 4) (see FIG. 2 (C)) of the third and fourth channel PCM audio data from the modulating circuit 47A is supplied to an input terminal "c" of the switching circuit 20A; and the B channel signal Sb(3, 4) (see FIG. 2 (C)) of the third and the fourth channel PCM audio data from the modulating circuit 47B is supplied to the input terminal "c" of the switching circuit 20B.

A switching signal from the servo control and switching signal generating circuit 103 operates the switching circuits 20A and 20B within a 180-degree area on the tape (corresponding to a half-field period) which is scanned by the pair of rotating heads 1A, 1B or 2A, 2B. As a result, these switching circuits operate as follows:

During a period tc, shown in FIG. 2, which corresponds to the tape area scanned by the rotating heads 1A, 1B or 2A, 2B from a track scan start point to the end of the PCM audio signal recording area PA34, the switching circuits 20A and 20B are each set to the respective input terminal "c". In this period, as shown in FIG. 2 (C), the switching circuits 20A and 20B respectively supply the PCM audio data Sa(3, 4) and Sb(3, 4) for the third and fourth channels.

During a period tb, shown in FIG. 2, which corresponds to the tape area scanned by the rotating heads 1A, 1B or 2A, 2B throughout the PCM audio signal recording area PA12, the switching circuits 20A and 20B are each set to the respective input terminal "b". In this period, as shown in FIG. 2 (B), the switching circuits 20A and 20B respectively supply the PCM audio data Sa(1, 2) and Sb(1, 2) for the first time and the second channels.

During a period ta, shown in FIG. 2, which corresponds to the tape area scanned by the rotating heads 1A, 1B or 2A, 2B which follows the PCM audio signal recording area PA12 and which continues for the area corresponding to the remainder of the half-field period, the switching circuits 20A and 20B are each set to the respective input terminal "a". In this period, as illustrated in FIG. 2 (A), the switching circuits 20A and 20B respectively supply the video signals Va and Vb for the A and the B channels.

The output signals from the switching circuits 20A and 20B are respectively supplied through recording amplifiers 21A and 21B and through head switching circuits 22A and 22B to the rotating heads 1A, 1B or 2A, 2B. A head switching signal from the servo control and switching signal generating circuit 103 is supplied to the head switching circuits 22A and 22B. As a result, the head switching circuits 22A and 22B are either each set to a terminal H1 over a 180-degree area in which the heads 1A and 1B contact the tape or the switching circuits 22A and 22B are each set to a terminal H2 over a 180-degree area in which the heads 2A and 2B contact the tape.

When the heads 1A and 1B form the tracks TA1 and TB1 in a substantially simultaneous manner, as previously described, the third and the fourth channels of audio data are recorded in the PCM audio signal recording area PA34 of the two tracks TA1 and TB1. Likewise, the first and the second channels of audio data are recorded in the PCM audio signal recording area PA12 of the tracks TA1 and TB1. The video signal of a half field is recorded in the video signal recording area VA of the tracks TA1 and TB1.

In a similar manner, the heads 2A and 2B record the first through the fourth channels of PCM audio data and the video signal of another half field across the tracks TA2 and TB2.

In accordance with the above-described technique of recording data, the first and the second channels of audio data which are of primary importance are recorded in the recording area PA12, which is farther away longitudinally from the ends of the recording tracks TA1, TB1, TA2 and TB2 than the third and the fourth channels of audio data which are of secondary importance and which are recorded in the recording area PA34. Since the rotating heads 1A, 1B, 2A and 2B maintain more stable contact with the tape in the recording area PA12 than in the recording area PA34, the error rate associated therewith is lower in the area PA12. Thus, during reproduction, the degradation in sound quality for the first and the second channels is minimized.

Figures 6, 6A:
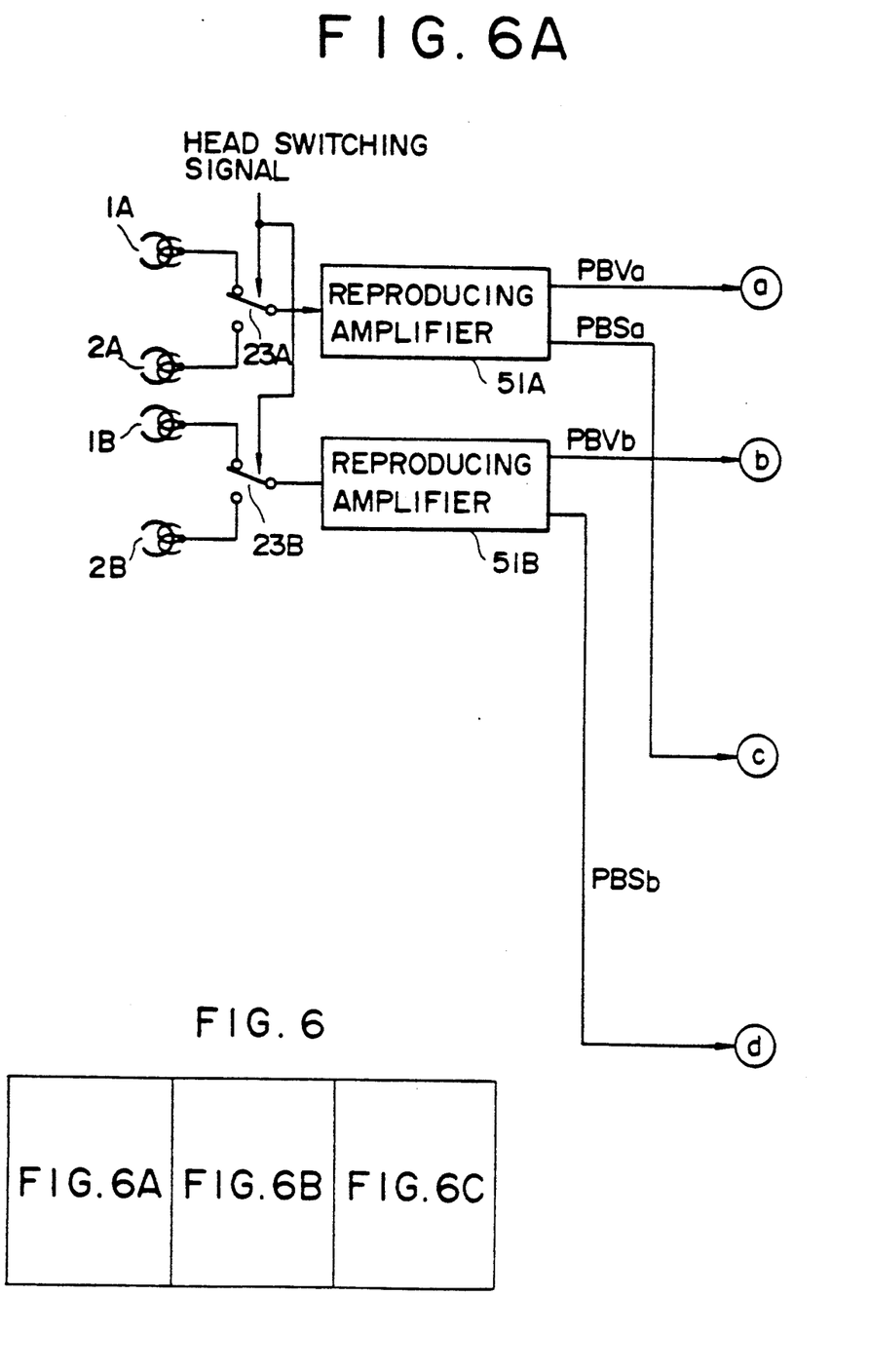
Figure 6B:
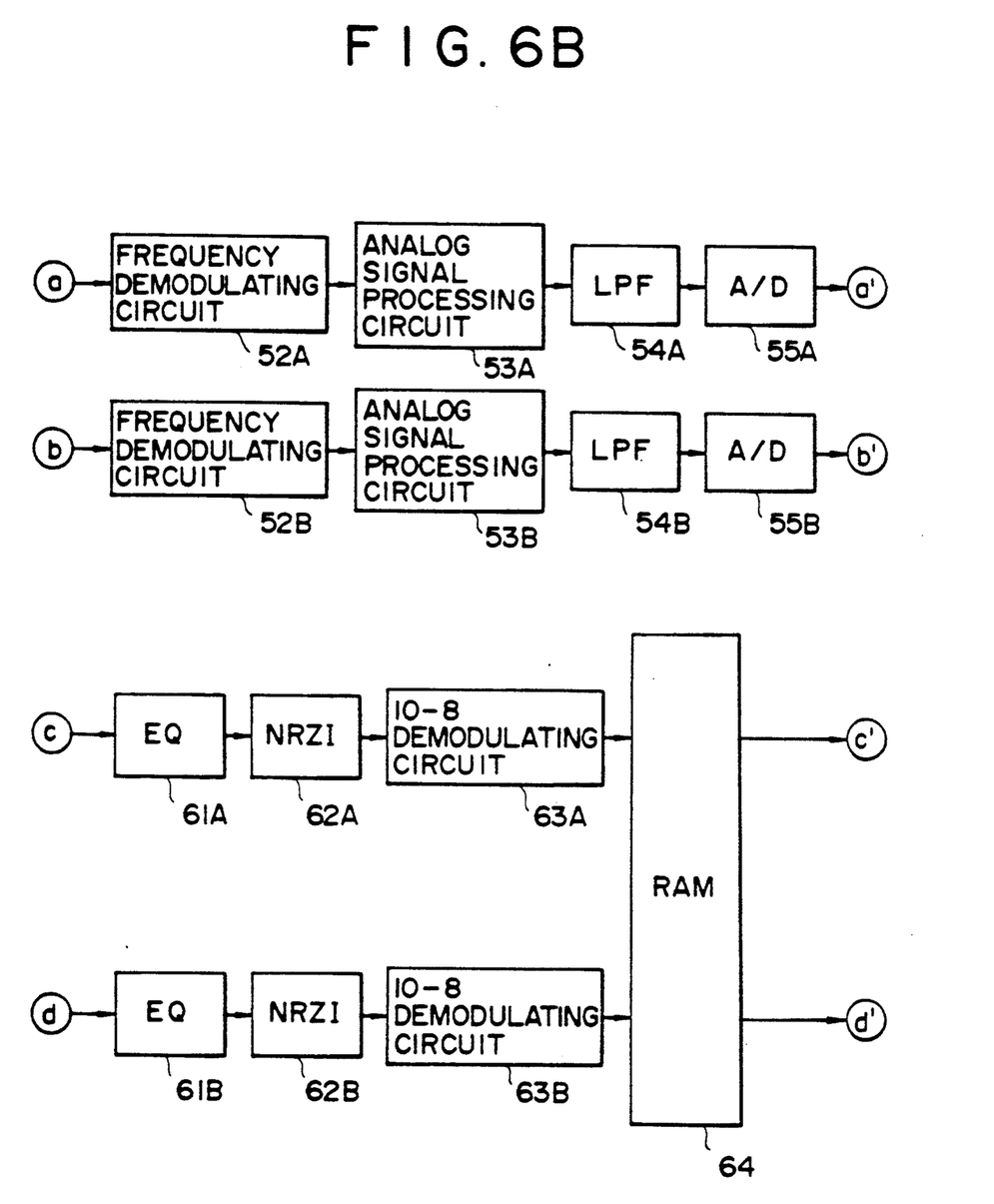
Figure 6C:
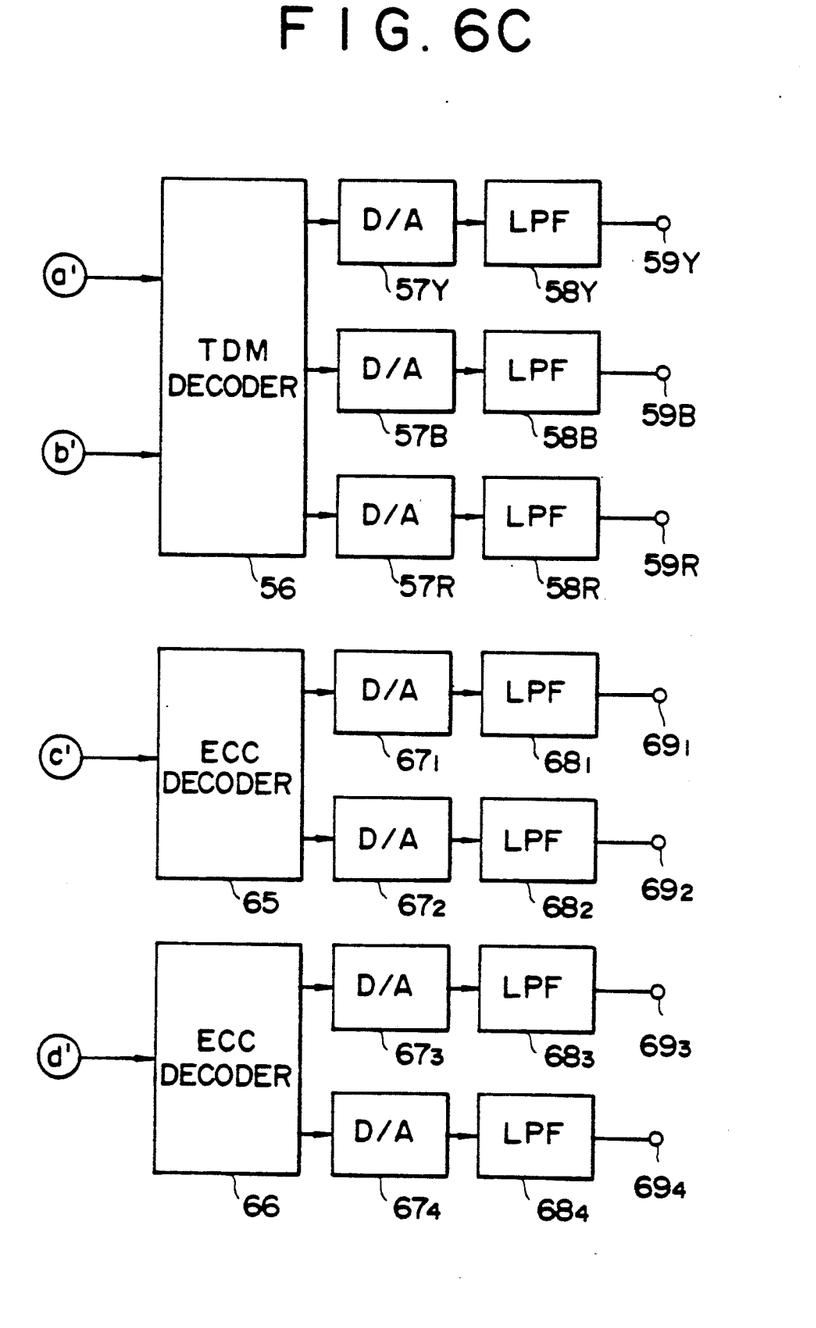

FIG. 6 is a block diagram of a reproducing apparatus to which the present invention may be applied. This apparatus reproduces video and audio signals from a tape on which video and audio data were recorded as described above.

In FIG. 6, a head switching circuit 23A alternately selects the rotating head 1A or 2A for each 180-degree angular rotation of the rotating drum 3 during which time the selected head contacts the tape. As a result, the head switching circuit 23A produces an A channel reproduced signal which is supplied to a reproducing amplifier 51A. Similarly, a head switching circuit 23B alternately selects the rotating head 1B or 2B. The switching circuit 23B then produces a B channel reproduced signal which is supplied to a reproducing amplifier 51B.

The reproducing amplifier 51A produces an A channel reproduced video signal PBVa and an A channel reproduced PCM audio signal PBSa. The signal PBVa is obtained from the video area VA and the signal PBSa is obtained from the PCM audio signal recording areas PA34 and PA12 of the tracks TA1 and TA2. The reproducing amplifier 51B provides a B channel reproduced video signal PBVb and a B channel reproduced PCM audio signal PBSb. The signal PBVb is obtained from the video area VA of the tracks TB1 and TB2, and the signal PBSb is obtained from the PCM audio signal recording areas PA34 and PA12 of the same tracks TB1 and TB2.

The A and the B channel reproduced video signals PBVa and PBVb from the reproducing amplifiers 51A and 51B are respectively frequency demodulated by frequency demodulating circuits 52A and 52B. The produced demodulated signals are respectively supplied to analog processing circuits 53A and 53B for de-emphasis and other analog processing. The output signals from the analog processing circuits 53A and 53B pass respectively through low-pass filters 54A and 54B to A/D converters 55A and 55B for conversion to digital format. The converted signals are supplied to a TDM decoder 56 which converts the received TDM signals back to the set of signals initially received by the recording apparatus of FIG. 4, that is, the luminance signal and the blue and red color difference signals.

The luminance signal from the TDM decoder 56 is converted back into the initial analog format by a D/A converter 57Y and a low-pass filter 58Y. The reproduced luminance signal is then supplied to an output terminal 59Y.

The blue and red color difference signals from the TDM decoder 56 are respectively converted back into their initial analog format by D/A converters 57B and 57R and low-pass filters 58B and 58R. The reproduced blue and red color difference signals are supplied to output terminals 59B and 59R, respectively.

The A and the B channel reproduced PCM audio data PBSa and PBSb from the reproducing amplifiers 51A and 51B pass respectively through reproducing equalizers 61A and 61B to NRZI decoding circuits 62A and 62B for decoding. The decoded data from the decoding circuits 62A and 62B are respectively demodulated by 10-8 demodulating circuits 63A and 63B so as to be converted to eight bits per sample. The output data of 10-8 demodulating circuits 63A and 63B are supplied to a RAM 64 and are therein divided into two groups of audio data: one for the first and the second channels, and another for the third and the fourth channels. The group having the first and the second channels of audio data is supplied to an ECC decoder 65, and the group having the third and the fourth channels of audio data is supplied to an ECC decoder 66. The ECC decoders 65 and 66 respectively decode the received audio data so as to obtain the initial first through fourth channels of data in the initial sampling order. Errors found in the data are corrected by the ECC decoders 65 and 66. If any error is found to be uncorrectable, data obtained by interpolation which effectively matches the correct data are used to bypass the data error. Here, the first and the second channels of audio data are supplied from the area PA12 where, as previously described, the contact fit between the tape and the rotating head is relatively stable. Thus, the first and second channels of audio data may contain far fewer errors than the third and the fourth channels of audio data obtained from the area PA34.

The ECC decoder 65 generates the first and the second channels of audio data which are converted into their initial analog format by D/A converters $67_1$ and $67_2$ and by low-pass filters $68_1$ and $68_2$. After the conversion, the analog audio signals are supplied to output terminals $69_1$ and $69_2$.

The ECC decoder 66 produces the third and the fourth channels of audio data which are converted back to their initial analog format by D/A converters $67_3$ and $67_4$ and by low-pass filters $68_3$ and $68_4$. After the conversion, the analog audio signals are supplied to output terminals $69_3$ and $69_4$.

In the above-described recording apparatus, the recording track pattern of FIG. 1 is not necessarily only obtained by using the rotating head device of FIG. 7. Alternatively, other suitable devices may be used to form the necessary track pattern.

Although, the above-described recording apparatus handles four channels of audio signals, the present invention is not limited to such apparatus and may instead be applied to apparatus which handles a different number of channels of audio signals.

Thus, as previously described in accordance with the embodiment of the present invention, audio signals carried by at least four channels are given priorities for preferential recording onto blocks in a tape which start from the tape end. The higher the priority assigned to the data, the farther away is the recording position or block from the tape end. The farther away from the tape end, the more stable is the contact fit between the tape and the rotating head. As a result of using this arrangement, significantly fewer errors occur in the audio data of high priority channels as compared to the audio data of other channels, whereby audio signals having an overall higher sound quality are made available.

Although a preferred embodiment of the present invention has been described in detail herein with reference to the accompanying drawings, it is to be understood that the invention is not limited to that specific embodiment, and that various changes and modifications can be effected therein by one skilled in the art without departing from the scope or spirit of the invention as defined in the appended claims.

What is claimed is:

1. A method for recording audio signals onto a tape by a recording apparatus which also records video signals onto said tape, in which said apparatus has a plurality of rotating heads which simultaneously scan said tape, said method comprising the steps of:

forming an oblique recording track on said tape for each of said rotating heads which simultaneously scan said tape without any guard bands being inserted between the oblique recording tracks, the formed oblique recording tracks constituting one segment;

recording said video signals in a longitudinal direction in a video signal recording area in each of said oblique recording tracks for each said segment;

arranging at least four channels of audio signals into a plurality of groups, in which each of said groups includes said audio signals from a plurality of said channels and is assigned a predetermined priority rating; and recording in a longitudinal direction, for each said segment, said audio signals in each of said groups which correspond to the video signals recorded for the respective segment in a number of audio signal recording areas in each of said oblique recording tracks, the number of said recording areas being equal to the number of said groups, in which each of said audio signal recording areas is separated from the corresponding video signal recording areas and is located at a respective distance in the longitudinal direction from an end of the respective oblique recording tracks, and in which the audio signals from each of said groups are recorded in said audio signal recording areas in accordance with the respective predetermined priority rating such that the audio signals from the group having the highest priority rating are recorded in the audio signal recording area located at the farthest distance from the end of the respective oblique recording track.

2. A method for recording audio signals according to claim 1, wherein said apparatus records and reproduces high definition television signals.

3. A method for recording audio signals according to claim 2, wherein said high definition television signals are broadcast using a multiple sub-nyquist sampling encoding method.

4. A recording apparatus for recording video signal sand primary and secondary pulse code modulated audio signals, said apparatus comprising:
- a video signal processing circuit for processing incoming video signals into a signal form suitable for recording;
- a first audio pulse code modulated processing circuit for processing incoming primary audio signals of a relatively grater degree of importance into said primary pulse code modulated audio signals;
- a second audio pulse code modulated processing circuit for processing incoming secondary audio signals of a relatively lesser degree of importance into said secondary pulse code modulated audio signals;
- rotary magnetic head means for scanning tracks extending obliquely across a recording tape from starting ends of said tracks adjacent one side edge of the tape to terminating ends of said tracks adjacent another side edge of the tape; and 'means for supplying the processed video signals and said primary and secondary pulse code modulated audio signals to said head means for recording by the latter in the scanned tracks such that said secondary pulse code modulated audio signals are recorded in track areas adjacent at least one of said starting and terminating ends of each of said tracks and said primary pulse code modulated audio signals are recorded in track areas positioned between track areas containing said processed video signals and said track areas containing said secondary pulse code modulated audio signals.

5. A recording apparatus according to claim 4, wherein said tape is wound around approximately 180 degrees of a tape guide drum and said rotary magnetic head means simultaneously records, during said 180 degrees, said processed video signals and said primary and secondary pulse code modulated audio signals in two parallel said tracks of said tape.

6. A recording apparatus according to claim 5, wherein said rotary magnetic head means includes first and second pairs of magnetic head, in which the first pair of magnetic heads is positioned apart from the second pair of magnetic heads by approximately 180 degrees.

7. A recording apparatus according to claim 6, wherein said primary pulse code modulated audio signals are contained on two audio channels and said secondary pulse code modulated audio signals are contained on two other audio channels.

* * * * *